No. 826,154. PATENTED JULY 17, 1906.
W. W. DOOLITTLE.
WELDED PIPE FLANGE.
APPLICATION FILED APR. 1, 1904.
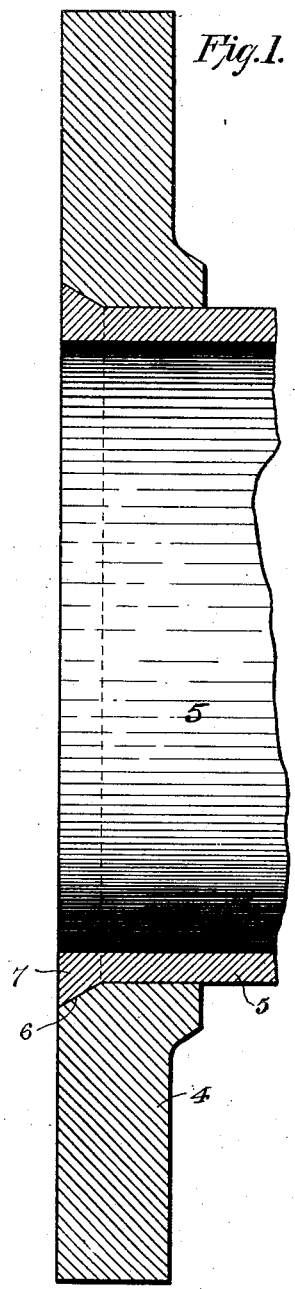
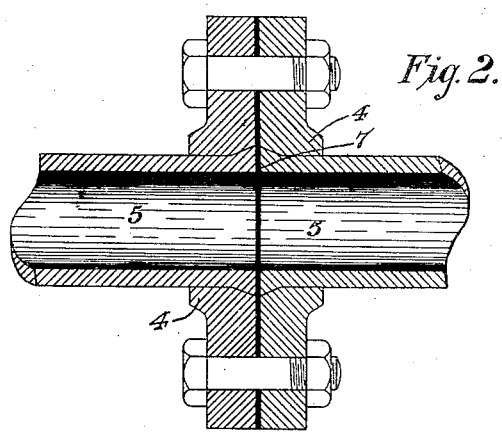
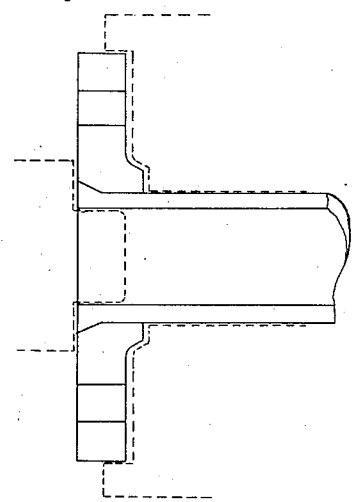
Witnesses:
Cyril C. Cick
F. W. H. Clay
Inventor,
William W. Doolittle
per
Paul Synnestvedt
Att'y

UNITED STATES PATENT OFFICE.

WILLIAM W. DOOLITTLE, OF CHICAGO, ILLINOIS, ASSIGNOR TO CRANE COMPANY, OF CHICAGO, ILLINOIS, A CORPORATION OF ILLINOIS.

WELDED PIPE-FLANGE.

No. 826,154.     Specification of Letters Patent.     Patented July 17, 1906.

Application filed April 1, 1904. Serial No. 201,092.

*To all whom it may concern:*

Be it known that I, WILLIAM W. DOOLITTLE, a citizen of the United States, residing at Chicago, in the State of Illinois, have invented a certain new and useful Welded Pipe-Flange, of which the following is a specification.

My invention relates to pipes supplied with flanges on the ends thereof to make connecting joints between successive lengths of pipe, and particularly to pipes having flanges welded thereon. The objects of the invention are, to secure a solid joint between the pipe and the flange by welding the two together, to prepare the joint so that the inner surface of the pipe is flush clear to the surface of the flange so that there are no water pockets formed at the joint when the pipes are put together, and to generally improve the structure of pipe flanges. These objects, and such other advantages as will hereinafter appear, I attain by means of the construction illustrated in preferred form in the accompanying drawings, wherein—

Figure 1 is a central longitudinal section of a portion of a large iron pipe with its flange welded thereon according to my method;

Figure 2 is a sketch showing the joining of two lengths together so that the inner surface is perfectly plain, and Figure 3 is a sketch illustrating a mode of forming the inner surface of the pipe in upsetting it into the groove in the flange.

In order to make a better and tighter joint than is possible by rolling in the pipe I prefer to weld it in place; and in order to attain a stronger connecting structure than is possible between pipes and flanges wherein there is no offsetting of the metal of the pipe into the flange, and to give the flange a secure hold on the pipe in addition to the welding, I provide the flange 4 with a counter sunk seat 6 around the circumference, and, after placing the pipe 5 therein, I upset the end so as to thicken it at 7 and fill up the counter sink 6, using for this purpose some form of forging tool, as will shape the end of the pipe flush with the side of the flange and at the same time preserve the interior of the upset portion flush with the general surface of the pipe, (as for example, by dies, as illustrated in the sketch, Figure 3).

The result is that the pipe not only has a very secure hold upon the flange both by the enlargement and by the welding, but when several sections of pipe are joined together as illustrated in Figure 2 it will be seen that the ends of the pipe abut on a perfectly even line and leave no water pockets at the joints. Other advantages will readily occur to those familiar with the art.

Having thus described my invention and illustrated its use, what I claim as new, and desire to secure by Letters Patent, is the following:

1. The combination of a pipe flange having a countersink in its outer face, and a pipe rigidly secured thereto and having an upset end entirely filling said counter-sink and flush with said outer face of the flange and with the interior surface of the pipe.

2. The combination of a flange having a counter sink on the outer face of the opening therein, and a pipe welded in said flange and having its end upset to fill said counter sink, and the upset end of the pipe being forged so that its inner surface is flush with the general surface of the pipe and the outer end surface is flush with the side of the flange, substantially as described.

In testimony whereof I have hereunder signed my name in the presence of the two subscribed witnesses.

WILLIAM W. DOOLITTLE.

Witnesses:
  PAUL CARPENTER,
  EDWARD C. BURNS.